United States Patent [19]

Philippe

[11] Patent Number: 4,537,431
[45] Date of Patent: Aug. 27, 1985

[54] LOCKING DEVICE, PARTICULARLY FOR A SPARE WHEEL CRADLE

[75] Inventor: Calin Philippe, Pontchartrain, France

[73] Assignee: Regie Nationale des Usines Renault, Boulogne-Billancourt, France

[21] Appl. No.: 492,383

[22] Filed: May 6, 1983

[30] Foreign Application Priority Data

May 6, 1982 [FR] France .................. 82-07860

[51] Int. Cl.³ .............................................. E05C 3/26
[52] U.S. Cl. .................. 292/216; 224/42.21; 414/466; 292/336
[58] Field of Search ............... 292/216, 336, DIG. 14; 70/259; 214/454; 224/42.21, 42.23

[56] References Cited
U.S. PATENT DOCUMENTS

| | | | |
|---|---|---|---|
| 2,806,727 | 9/1957 | Johnstone | 292/336 X |
| 2,846,253 | 8/1958 | Johnstone | 292/216 |
| 3,918,599 | 11/1975 | Porter | 70/259 X |
| 4,317,533 | 3/1982 | Barré et al. | 224/42.21 |

Primary Examiner—Richard E. Moore
Attorney, Agent, or Firm—Oblon, Fisher, Spivak, McClelland & Maier

[57] ABSTRACT

A locking device, particularly for a spare wheel cradle 12 mounted to pivot under the floor 14 of an automobile, the cradle being able to be released from inside the automobile by a control mechanism 28-34 connected to a locking mechanism 16 including a housing 18 mounted under the floor, a retaining hook 36 for retaining the cradle 12 and a safety hook 38, the cradle causing being automatically locked by the retaining hook when the cradle is put in place under the floor. The locking mechanism 16 includes a mechanism for retaining the safety hook in a retracted position when the cradle is in the released position, release of the retaining mechanism 100 being controlled by the automatic locking of the cradle 42 by the retaining hook 36.

6 Claims, 3 Drawing Figures

4,537,431

LOCKING DEVICE, PARTICULARLY FOR A SPARE WHEEL CRADLE

BACKGROUND OF THE INVENTION

1. Field of the Invention

The invention is directed to a locking device for a spare wheel cradle mounted to pivot under the floor of an automobile, the cradle being able to be released from inside the automobile by a control connected to a locking mechanism.

2. Description of the Prior Art

Retaining devices are known in which the locking mechanism comprises a housing mounted under the flow, a retaining hook for the cradle and a safety hook, the cradle causing its automatic locking by the retaining hook when it is put in place under the floor. This type of device is particularly described and represented in French Patent Application No. 78.02.471 corresponding to French Pat. No. 2,415,708 and U.S. Pat. No. 4,317,533.

The presence of the safety hook is due to safety standards which provide for this hook to prevent the accidental release of the spare wheel from the cradle in case of inadvertent operation by the driver of the vehicle or in case the retaining hook is broken. Often it is found that, after a normal use of the retaining device, when changing a wheel of the vehicle, the cradle is held only by the safety hook and is not locked in position by the retaining hook. This poor positioning occurs generally when the driver has not reset the cradle with a force sufficient to engage the retaining hook and to cause the automatic locking of this retaining hook and when the driver has not performed the manual locking of the retaining hook.

SUMMARY OF THE INVENTION

This invention has as its object to eliminate this major drawback of the prior art and proposes, for this purpose, a locking device of the type mentioned above characterized in that the locking mechanism has means for retaining the safety hook in a retracted position when the cradle is in the released position, releasing of said retaining means being controlled by the automatic locking of the cradle by the retaining hook.

It is understood that as a result of this characteristic, it is impossible, during operation for placing the cradle back in place, to have the latter rest only on the safety hook without automatic and main locking by the retaining hook being assured.

According to another characteristic of the invention, said retaining means consists of retractable stop means that works with the safety lever to be automatically retracted when the safety lever is brought into its retracted position, the retraction of said stop means being controlled automatically during the locking of the cradle by said retaining hook.

The invention finds, in particular, its application in a retaining device in which the locking mechanism includes: a housing in the shape of a cover, a retaining hook mounted to pivot around a first shaft mounted inside said cover, a catch mounted to pivot on a second shaft ounted on said cover, said catch and said retaining hook being pulled edge to edge in contact against one another by a draw spring hooked in two notches formed on said retaining hooks and said catch, said edges in contact exhibiting two complementary releases which work together to lock the retaining hook by the catch in the position corresponding to locking of the cradle, said catch being connected directly to said control, and a safety hook mounted on a third shaft, mounted in the cover, around which it is able to pivot from a safety position, in which a notch formed in the safety hook holds the cradle in a slot formed in the flanges of said cover, to its retracted position in which said cradle is free to leave said slot, said safety hook being provided with a return spring that continuously pulls it to said safety position.

In this particular application, said retractable stop means consists of a first lug formed on said catch and by a second lug formed as a part of said safety lever, said first lug working with said second lug closed by the safety lever to prevent any pivoting of the safety lever to said safety position when such occupies said retracted position and said cradle is in the released position.

This characteristic makes it possible to make, in a simple way, a device according to the teachings of this invention without increasing the number of components of the locking mechanism, nor unduly complicating their manufacture.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
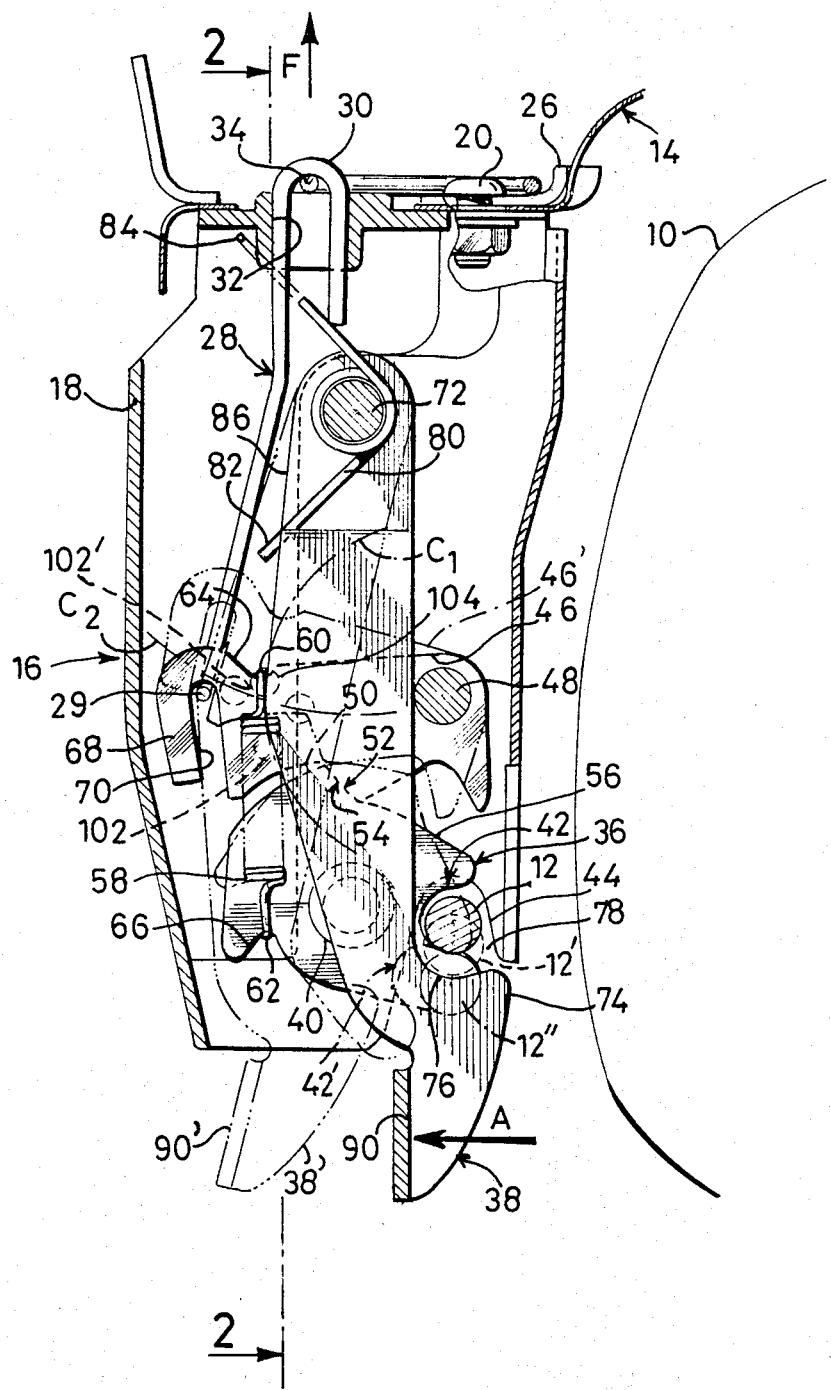
FIG. 1 is a view in section, taken along line 1—1 of FIG. 2, of a locking device made according to the teaching of this invention.

With reference to FIG. 1, there is disclosed the profile of a spare wheel 10 held in place in a cradle 12, of which only the end portion provided to work with the retaining device and which is the object of this invention, is represented. Cradle 12 is mounted to pivot under floor 14 of the vehicle. This type of cradle and its articulation are represented in greater detail in FIGS. 1 and 2 of U.S. Pat. No. 4,317,533 mentioned above, to whose specification reference can also be made, by way of example.

The retaining device comprises a locking mechanism 16 whose housing 18 in the shape of a cover is made of a bent sheet and is attached to the floor 14 of the vehicle by two screws 20 mounted in openings 22 made in the upper plate 24 of housing 18. A reinforcing plate 26 is placed between the heads of screws 20 and the sheet that constitutes floor 14.

Control of the locking device is assured by a pull rod 28 whose upper bent end 30 slides in opening 32 of body 18 of the locking mechanism and is accessible from the inside of the vehicle by a ring 34 which is slipped into upper bent end 30. Ring 34 rests on plate support 26 and is generally accessible from the inside of the trunk of the vehicle.

Locking mechanism 16 also comprises a retaining hook 36 for cradle 12 and a safety hook 38. Retaining hook 36 is mounted to pivot on a first shaft 40 mounted on a central wall 19 of the housing in the shape of a cover 18. Retaining hook 36 comprises a piece of cut sheet exhibiting in its lower part a notch 42 with a semicircular shape which works with a half-circle slot 44 made in the side flanges of cover 18 to hold cradle 12 which in the embodiment shown is made of wire having a cylindrical section. Slot 44 is open at the lower part of the locking mechanism to make possible the introduction or the removal of cradle 12. When the cradle occupies its normal position, i.e., when it is locked by retaining hook 36, it rests on the profile of notch 42 made in retaining hook 36.

Retaining hook 36 is held in locked position by a catch 46. Catch 46 is mounted to pivot on a second shaft 48 mounted inside cover 18. A lower edge 50 of catch 46 exhibits a release 52 which works with a complementary release 54 formed by upper edge 56 of retaining hook 36 to lock the retaining hook in the position corresponding to the locking of cradle 12. Edges 50 and 56 of catch 46 and of retaining hook 36 are biased into contact one against the other by a catch spring 58 consisting of a spiral draw spring whose ends 60 and 62 are fixed in notches 64 and 66 made on catch 46 and retaining hook 36, respectively. Free end 68 of the catch is provided with a slot 70 in which is received bent lower end 29 of pull rod 28. Catch 46 is thus connected to pull rod 28, its pivoting around shaft 48 being able to be caused by an action of the operator on the manual control consisting of pull rod 28.

Safety hook 38 is mounted to pivot in cover 18 by a third shaft 72 mounted inside this cover. A lower end 74 of safety hook 38 located opposite shaft 72 is provided with a notch 76 in the arc of a circle which works with the half-circle slot 44 made in cover 18 to hold cradle 12 when safety hook 38 is in its normal safety position represented in FIG. 1. Actually, in this safety position, it is found that the cradle is held in space 78 delimited by slot 44 and notch 76 from which it cannot escape even in case of accidental pivoting or in case retaining hook 36 is broke. The safety hook is provided with a return spring 80 consisting of a spiral spring coiled around shaft 72 and whose ends 82 and 84 rest, on the one hand, on side edge 86 of safety hook 38 and, on the other hand, in a hole 88 made in cover 18.

Figure 2:
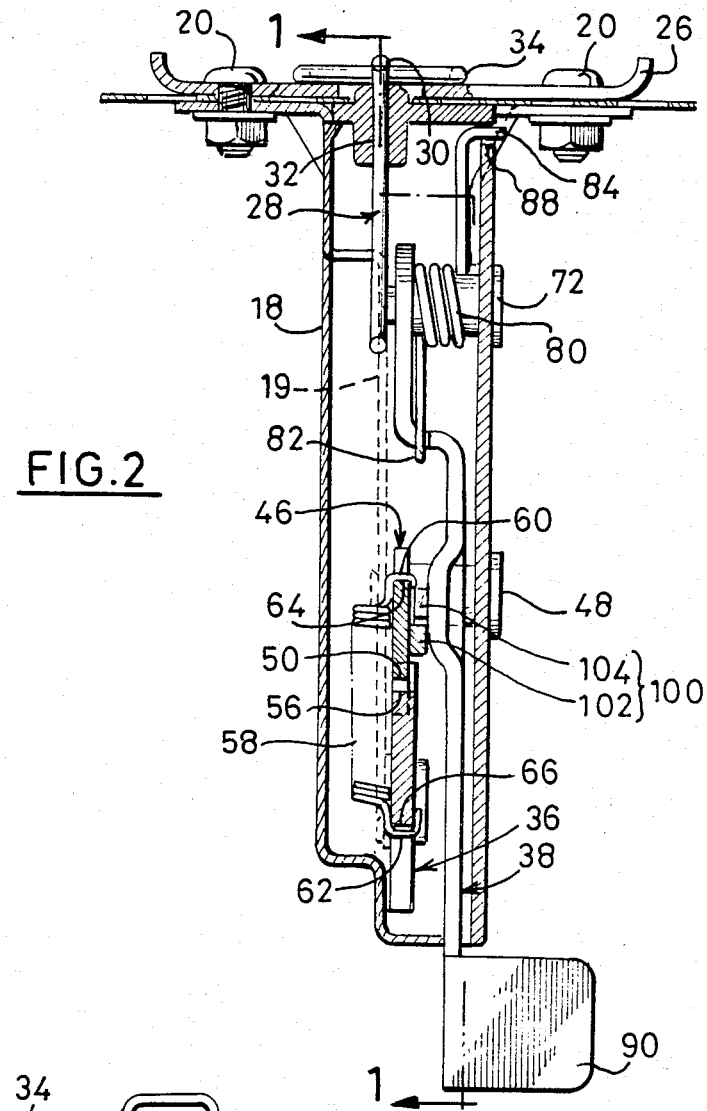
FIG. 2 is a view in section, taken along line 2—2 of FIG. 1.
Figure 3:
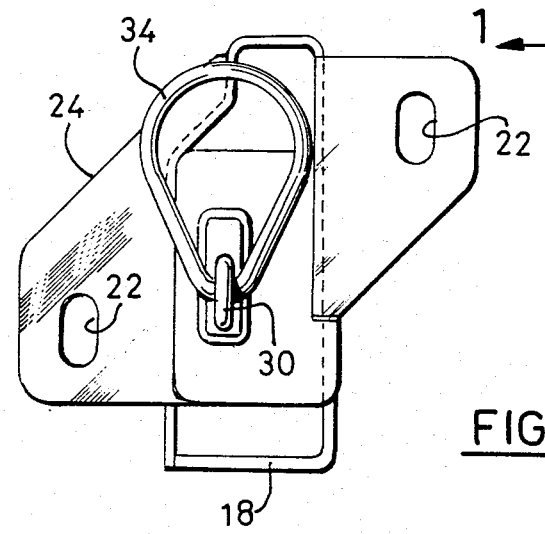
FIG. 3 is a top view of the device represented in FIG. 1.

Safety hook 38 is able to pivot around its shaft 72 from the safety position in which it is shown in FIGS. 1 and 2 to its retracted position represented by chain-dotted lines in FIG. 1. This pivoting can be caused by acting on a lug 90, made at the free end 74 of hook 38, in opposition to the elastic force exerted by return spring 80.

According to this invention, locking mechanism 16 has retaining means 100 provided to assure the hold of safety hook 38' in its retracted position when the cradle is in the released position. The retaining means consist of retractable stop means comprising a first lug 102 on catch 46 and second lug 104 made on safety lever 38. Lugs 102 and 104 are in the shape of cylindrical pins, forming one piece with catch 46 and safety lever 38, respectively. As can be seen in FIG. 2, lugs 102 and 104 are formed on the surfaces opposite catch 46 and safety lever 38 and are able to work together during the operation of the locking mechanism in a way which will be described below.

In FIG. 1, also represented in chain-dotted lines are the positions occupied by catch 46 and retaining hook 36 when the cradle is in the unlocked position. When the driver of the vehicle wants to cause the release of cradle 12 of the spare wheel, he must unlock locking mechanism 16. To do this, the driver pulls pull rod 28 housed in the trunk along arrow F by means of ring 34.

During operation, the pull rod slides in opening 32 and bent lower end 29 moves vertically in the direction of arrow F and thus causes the pivoting of catch 46 around its shaft 48. Catch 46 thus pivots from its locked position in which releases 52 and 54 work together to its unlocked position 36, represented in FIG. 1, this pivoting being done in opposition to the elastic force exerted by catch spring 58. The unlocked position of catch 36 corresponds to the disengagement of release 52 from complementary release 54 made on the retaining hook. From this moment, releases 52 and 54 no longer work together and retaining hook 36 is free to pivot around its shaft in a clockwise direction. Retaining hook 36 pivots around its shaft 40 under the action of the weight of the spare wheel supported by the cradle. During this pivoting, cradle 12 moves vertically downward in slot 44 until it comes against notch 76 formed in safety hook 38 and occupies position 12' represented by chain-dotted lines in FIG. 1.

To cause the complete release of cradle 12, the driver must act on safety hook 38. To do this, the driver acts on lug 90 in the direction indicated by arrow A. By pivoting from its safety position 38 to its retracted position 38', the safety lever release cradle 12 which is no longer held in slot 14 and which descends vertically bringing retaining hook 36 while pivoting until the latter occupies its final unlocked position 36'. In this position, semicircular notch 42 is directed downward and cradle 12 is free to continue its vertical descent from intermediarty position 12" represented by the dotted line in FIG. 1. In this position, the spare wheel is accessible to the driver of the vehicle.

It is found that during the unlocking, first lug 102 made on catch 46 moves along a first circular trajectory $C_1$ around shaft 48 from its locked position 102 to its unlocked position 102'. In the same way, second lug 104 made on safety hook 38 moves along a second trajectory $C_2$, around shaft 72 from said safety position 104, corresponding to the safety position of hook 38 to a retracted position 104' corresponding to the retracted position 38' of safety hook 38'.

According to this invention, first lug 102 must be on trajectory $C_2$ of the first lug when catch 36 is in its unlocked position 36. As a result of this arrangement, second lug 104 works with first lug 102' during the pivoting of safety lever 38. When lug 104 strikes lug 102, and lug 90 continues to be acted upon, catch 36 pivots around its shaft in opposition to the elastic force exerted by catch spring 58 to make possible the retraction of first lug 102' by second lug 104, the first passing over the second and, thus to make it possible for hook 38 to pivot to its retracted position 38'. In this position, lug 104' rests against lug 102' and any pivoting of safety hook 38 is prevented by the retaining means thus defined.

When the driver wishes to put the spare wheel back in position under the floor of the vehicle, he causes cradle 12 to pivot and the end of this cradle moves vertically upward in the direction of slot 44 until it again occupies position 12". In this position, cradle 12" comes in contact with notch 42' made in retaining hook 36'. By continuing to act on cradle 12, the driver causes the rotation of hook 36' in a counterclockwise direction until it again occupies its locked position 36. As soon as this position is reached, catch 46 pivots, in turn, to its locked position 46 in which the two releases 52 and 54 work to lock retaining hook 36. When catch 46 pivots from its unlocked position 46' to its locked position 46, first lug 102 moves along trajectory $C_1$ in a clockwise direction to its locked position 102. During this movement, the first lug gradually retracts from in front of second lug 104 until occupying its locked position 102 in which it is no longer located along trajectory $C_2$ of lug 104. It is understood that safety hook 38', then, is no longer held in a retracted position and is, therefore, free to pivot automatically to its safety position 38 under the action of return spring 80.

If during the locking operation, the driver does not sufficiently raise cradle 12 to the position in which it is automatically locked in position by retaining hook 36 and catch 46, automatic release of the retaining means of safety hook 38 is not performed by the complete rotation of catch 46 and the cradle 12 will fall to the ground without being retained by safety hook 38. The driver must repeat his operation to obtain the automatic locking of cradle 12 by retaining hook 36.

It is understood that, according to this invention, the retractable stop means consisting of lugs 102 and 104 works with safety hook 38 to be automatically retracted when this safety hook is brought into its retracted position, the retraction of the stop means being performed automatically by the locking of cradle 12 by retaining hook 36.

The invention is not limited to the embodiment which has just been described, the lugs being able, for example, to be made on the safety hook and the retaining hook. Also, the invention is applicable to other types of cradles and to a device in which pull rod 28 controls simultaneously the pivoting of the retaining and safety hooks.

What is claimed as new and desired to be secured by Letters Patent of the United States is:

1. A locking device, particularly for a cradle mounted to pivot under the floor of a vehicle, comprising:
    control means for releasing the cradle from inside the vehicle; and
    a locking device connected to said control means and which further comprises a housing mounted under said floor of the vehicle, a retaining hook for retaining said cradle, and a safety hook positioned in said housing, said cradle being automatically locked by said safety hook upon said cradle being placed under said floor, wherein said locking mechanism further comprises means for retaining said safety hook in a retracted position and wherein release of said means for retaining said safety hook is controlled by automatic locking of said cradle by said retaining hook wherein said means for retaining said safety hook further comprises retractable stop means operatively associated with said safety hook so as to be automatically retracted when said safety hook is positioned in said retracted position, retraction of said retractable stop means being controlled automatically by the locking of said cradle by said retaining hook.

2. A locking device as set forth in claim 1, futher comprising:
    a first, second and third shaft mounted in said housing, said housing having at least one flange with a slot formed therein wherein said retaining hook is pivotally mounted to said first shaft;
    catch means pivotally mounted on said second shaft; and
    a catch spring biasing said catch means and said retaining hook so as to be in contact with one another wherein said catch means and said retaining hook further comprise, respectively, complementary release means for locking the retaining hook by said catch means in a position corresponding to locking of said cradle, said catch means being directly connected to said control means for releasing said cradle;
    said safety hook having a notch formed therein and being pivotally mounted on said third shaft so as to be pivotable from a safety position, in which said notch formed in said safety hook holds said cradle in said slot formed in said at least one flange of said housing, to said retracted position in which said cradle is positioned outside said slot, and wherein said safety hook further comprieses a return spring for continuously biasing said safety hook to said safety position and said means for retaining said safety hook is positioned both on said safety hook and on said catch means.

3. A locking device as set forth in claim 1, further comprising:
    a first, second and third shaft mounted in said housing, said housing having at least one flange with a slot formed therein wherein said retaining hook is pivotally mounted to said first shaft;
    catch means pivotally mounted on said second shaft; and
    a catch spring biasing said catch means and said retaining hook so as to be in contact with one another wherein said catch means and said retaining hook further comprise, respectively, complementary release means for locking the retaining hook by said catch means in a position corresponding to locking of said cradle, said catch means being directly connected to said control means for releasing said cradle;
    said safety hook having a notch formed therein and being pivotally mounted on said third shaft so as to be pivotable from a safety position, in which said notch formed in said safety hook holds said cradle in said slot formed in said at least one flange of said housing, to said retracted position in which said cradle is positioned outside said slot, and wherein said safety hook further comprieses a return spring for continuously biasing said safety hook to said safety position and said means for retaining said safety hook is positioned both on said safety hook and on said catch means.

4. A locking device as set forth in claim 3 wherein, said retractable stop means further comprises a first lug formed on said catch means and a second lug formed on said safety hook, said first lug cooperating with said second lug to prevent pivoting of said second lug to said safety position, when such occupies said retracted position and said cradle is in a release position.

5. A locking device as set forth in claim 4, wherein said first lug formed on said catch means is movable along a first circular trajectory from a locked position in which said complementary releases are operatively associated to an unlocked position in which said releases no longer are operatively associated and in which said retaining hook is free to pivot around said third shaft, said second lug moving along a second circular trajectory from a first position corresponding to said safety position of said safety hook to a second, retracted position corresponding to said retracted position of said safety hook, said first lug being located on said second trajectory when said catch occupies said unlocked position.

6. A locking device as set forth in claim 5, wherein said catch means is pivotable around said second shaft in opposition to a force exerted by said catch spring for retraction of said first lug by said second lug during pivoting of said safety hook from said safety position to said retracted position.

* * * * *